Oct. 15, 1968  R. M. BUCKERIDGE  3,406,371
CONNECTION BOX
Filed Oct. 18, 1965
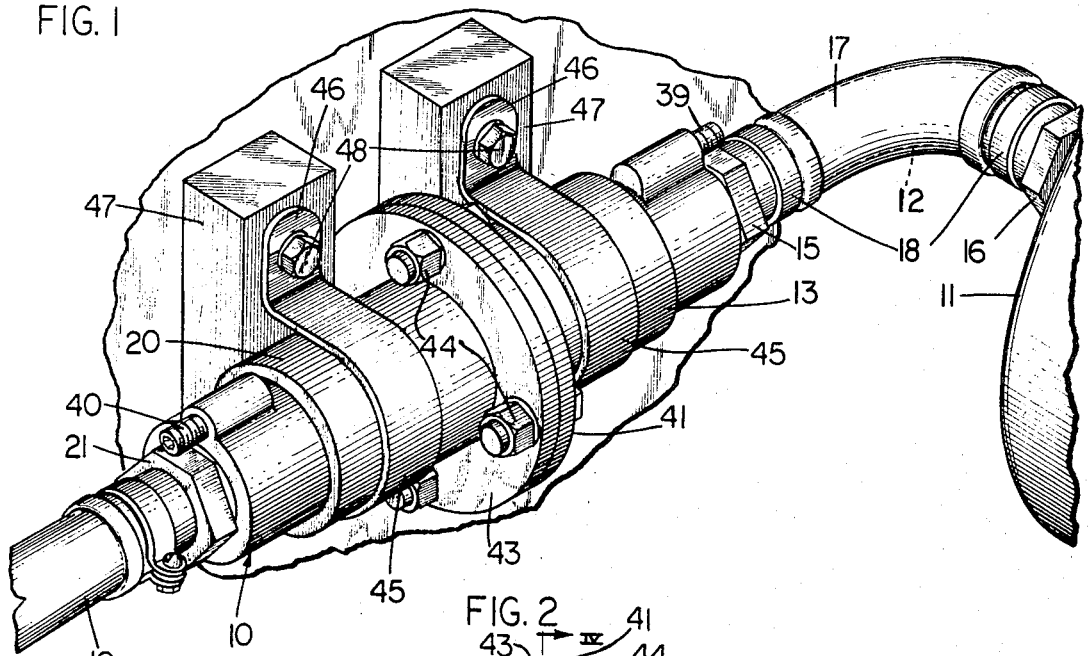
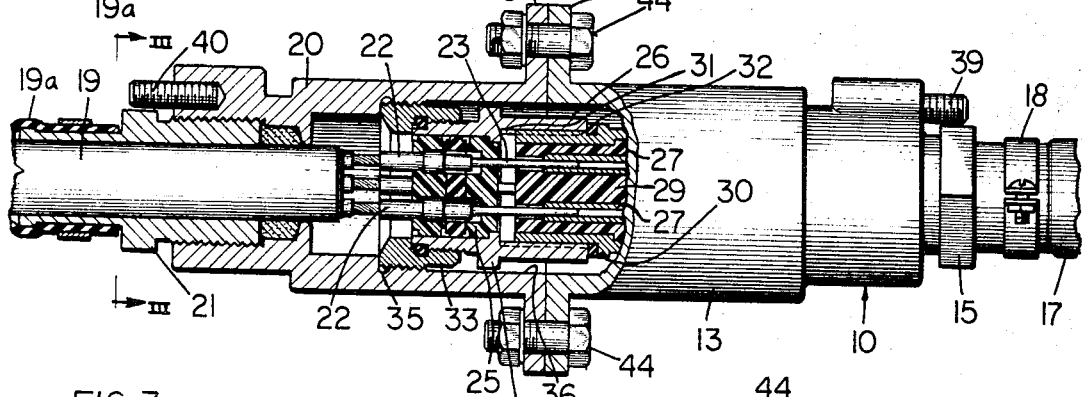
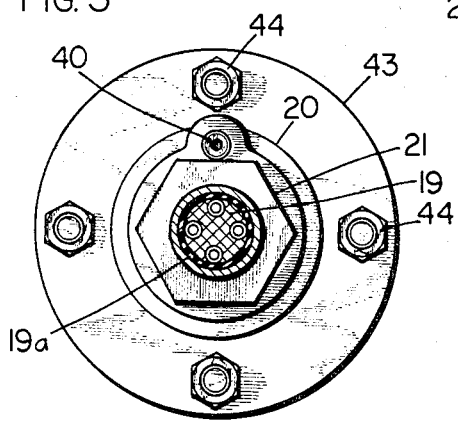
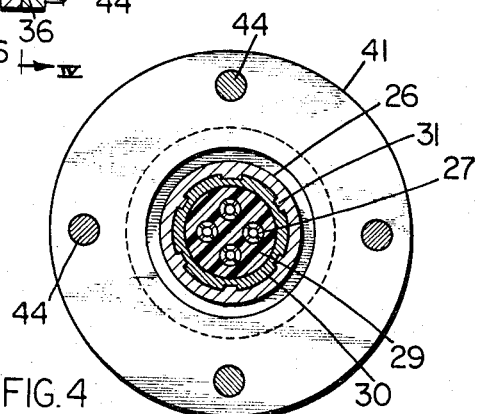
INVENTOR.
ROGER M. BUCKERIDGE
BY
Hill Sherman Meroni Gross & Simpson

United States Patent Office 3,406,371
Patented Oct. 15, 1968

3,406,371
CONNECTION BOX
Roger M. Buckeridge, Downers Grove, Ill., assignor to Westinghouse Air Brake Company, Pittsburgh, Pa., a corporation of Pennsylvania
Filed Oct. 18, 1965, Ser. No. 497,079
1 Claim. (Cl. 339—92)

ABSTRACT OF THE DISCLOSURE

Connection box for motors operable in confined areas, such as the traction motors for shuttle cars. The connection box is fastened to the frame of the machine and provides a compact quick disconnection for removal of the motor or other electrical component served by the connection box. Two identical shell sections flanged at the adjacent ends of the shell sections and bolted together in explosion proof relation with respect to each other, form the connection box. One shell section contains a plug electrical connector carried in a casing extending beyond the shell section. The other shell section contains a receptacle electrical connector contained in a casing having guiding engagement with the casing of the plug connector, to register the plugs with the receptacles. Packing glands with hose connections seal the electrical cables to the outer ends of the shell sections.

Background of the invention

This invention relates to improvements in connection boxes for making electrical connections to motors and the like and more particularly relates to such boxes as may safely be used in confined areas subject to explosive gases.

In the making of electrical connections to motors located in confined areas and particularly to the motors used for driving the individual wheels of shuttle cars and like apparatus used in mines underground, the motor in many cases is a part of the wheel unit and the wheel unit and motor must be mounted for easy and quick removal for servicing and inspection. The motor shell, therefore, does not have the space for the usual connection box incorporated into the motor shell as a part of the motor assembly.

Summary of the invention and objects

In accordance with the principles of the present invention I remedy these deficiencies by connecting each motor to its source of power by a plug and receptacle connector and enclose the plug and receptacle connection in two shell sections, detachably secured together in explosion proof relation with respect to each other, and detachably connected to the frame of the shuttle car.

Another object of the invention is to provide a safe electrical connection for the energizing power line for a motor of a type adapted to be operated in confined spaces, which reduces the size of the motor casing heretofore required for the connection box, and is of such a compact form and flame proof construction as to be capable of being mounted separate from the motor to accommodate removal of the motor and a connected connector of the connection box as a unit.

Another object of the invention is to provide an improved form of connection box for motors adapted for use in confined spaces, in which the connection box is separate from the motor and may be removed with the motor for inspection or repair, and is of such a safe construction that it may safely be used in mines underground.

Still another object of the invention is to improve upon the connection boxes heretofore in use in connecting electrical motors to sources of power by connecting the motor to the source of power through a plug and receptacle connection and by enclosing the plug and receptacle connection in two shell sections having facing flanges of sufficient area to cool and extinguish any flame within the shell sections, before reaching the atmosphere.

These and other objects of the invention will appear from time to time as the following specification proceeds and with reference to the accompanying drawings wherein:

FIGURE 1 is a perspective view of a connection box constructed in accordance with the principles of the present invention, showing the connection box electrically connected with a motor;

FIGURE 2 is a view in side elevation of the connection box shown in FIGURE 1 with parts broken away and other parts shown in longitudinal section;

FIGURE 3 is a transverse sectional view taken substantially along line III—III of FIGURE 2; and FIGURE 4 is a transverse sectional view taken substantially along line IV—IV of FIGURE 2.

In FIGURE 1 of the drawings, I have shown an electrical connection box 10, serving to connect a motor 11 to a source of power through a motor lead 12, leading from said connection box. The motor 11 may be the drive motor of a wheel unit for a shuttle car and the like and may be removed with the wheel unit including one section 13 of the connection box, where it is desired to service and inspect the wheel unit.

The motor lead 12 extends into the end of a shell section 13 of the connection box, and is sealed thereto as by a packing gland 15. The opposite end of the motor lead 12 extends into the motor shell and is sealed thereto as by a packing gland 16. The packing glands may each be conventional packing glands, such as are shown in section in FIGURE 2. A hose 17 which may be a rubber hose or which may be made from one of the well known substitutes for rubber, and which may be armored in certain circumstances, encloses the motor lead 12 and is shown as being clamped to the packing glands 15 and 16 at its opposite ends, as by hose clamps 18.

A connecting energizing cable 19 leads into a section 20 of the connection box, which may be like the section 13 of said box. The cable 19 is protected by a hose 19a like the hose 17 and extends into the box through a packing gland 21 and has a plurality of leads extending within and soldered to socket portions 22 of conductor plugs 23. The socket portions 22 and conductor plugs 23 may be integrally formed and are mounted within an insulating contact carrier assembly 25, carried in a generally cylindrical casing 26, and projecting therefrom for engagement with contact receptacles 27. The contact receptacles 27 have the leads of the motor lead cable 12 soldered or otherwise electrically connected thereto. The receptacles 27 are carried in a contact carrier insulator 29, mounted within a generally cylindrical casing 30.

The cylindrical casing 26 has an internally keyed portion 31 extending from the assembly 25 and slidable along the outside of the casing 30 and splined thereto, to maintain the plugs and receptacles in alignment with each other when connecting the receptacles 27 to the plugs 23. The end of the casing 26 is sealed to the casing 30, as by an O-ring 32.

The casing 26 has an externally threaded portion upon which is threaded a retainer nut 33, threaded in an internally threaded portion 35 of an interior cylindrical wall 36 of the connection shell 20. The casing 30 is mounted in the shell 13 in a similar manner.

Socket head screws 39 and 40 are shown as being threaded in the respective ends of the shell sections 13 and 20, to prevent tampering with and loosening of the gland nuts when once in place. The shell section 13 has a flange 41 extending radially therefrom for mating with a corresponding flange 43 extending radially from the shell section 20. A plurality of nuts and bolts 44 are provided to bolt the connecting shells 13 and 20 together and to accommodate ready disconnection of the shell sections. The facing surfaces of the flanges 41 and 43 should have sufficient radial length to provide the surface area to cool and extinguish any flame within the connection box before it reaches the atmosphere, to thereby prevent the ignition of any inflammable gas in the region of the connection box. The facing surfaces of the flanges 41 and 43 may also be machined and finished, and where the connection box is to meet Bureau of Mine standards, should be finished in accordance with these standards, to provide smooth mating surfaces with no imperfections.

The connection box 10 is shown as being secured to a frame member of the shuttle car (not shown) or other apparatus on which the connection box is to be mounted, by a pair of straps 45, 45 extending about the shell sections 13 and 20 and having outwardly extending feet 46 abutting the outer surfaces of blocks 47, 47, which may be metal blocks extending outwardly of and suitably secured to the machine frame. Machine screws 48 are provided to secure the straps 45 to the blocks 47 and thereby secure the connection box 10 to the machine frame. When it is desired to remove the motor 11 and its wheel, where the motor may be a part of the wheel unit of a shuttle car, it is merely necessary to remove the strap 45 extending about the shell section 13 and to then remove the nuts from the bolts 44 and separate the shell section 13 from the shell section 20 by pulling on the shell section 13, and at the same time the receptacles 27 will slide along the contact plugs 23 and effect the removal of the receptacle section of the connector from the plug section thereof.

The motor may then be readily inspected or repaired where necessary and the connection may readily be made by engaging the receptacles 27 with the plugs 23 by sliding the receptacles 27 inwardly along the plugs 23 and then bolting the flanges 41 and 43 together by the nuts and bolts 44. The shell section 13 may then be strapped to the frame of the machine by its strap 45 and machine screws 48 securing said strap to the block 47.

It may be seen from the foregoing that a simple and compact connection box has been provided for motors or other electrical components operating in confined places, and that this connection box consists essentially in two cylindrical shell sections, one of which contains a plug connector and the other of which contains a receptacle having receptacle contacts therein mating with the plugs, to make the connection between the cables 19 and 12 and provide an energizing circuit to the motor 11. The connecting box thus requires a minimum of space and provides a quick disconnection for the removal of the motor 11 or other electrical component it serves, and is of such a design and construction that it may readily be used as a connection box serving an electrical component operating in atmospheres containing explosive gases.

While I have herein shown and described one form in which the invention may be embodied, it may readily be understood that various variations and modifications in the invention may be attained without departing from the spirit and scope of the novel concepts thereof.

I claim as my invention:
1. In an electrical connection box,
a receptacle section including,
a receptacle casing,
an insulating contact carrier mounted within said receptacle casing and having a plurality of current conducting receptacles mounted therein spaced inwardly from the ends of said contact carrier,
an electric cable having conductors connected with said current conducting receptacles and leading from said receptacle section,
a plug section including,
a plug casing,
an insulating contact carrier mounted within said plug casing and having a plurality of conductor plugs extending from said contact carrier,
said plug casing having a generally cylindrical wall portion extending from said contact carrier and adapted to have slidable interengagement with said receptacle casing, to align said plugs to engage said receptacles upon movement of said plug section toward said receptacle section,
an electric cable having conductors connected with said plugs,
individual mating closure shells for said plug section and said receptacle section having said current conducting cables leading through the ends thereof and having interior peripheral wall portions having threaded portions adjacent the inner ends thereof,
nuts threaded on said plug and receptacle casings and sealed thereto and having threaded engagement with said threaded portions of said interior wall portions of said shells for mounting said receptacle section and said plug section in said shells to accommodate engagement of said plugs with said receptacles as said closure shells are axially moved into engagement with each other,
packing glands detachably mounted in the outer ends of said shells and having said cables extending therethrough and sealing said cables to said shells, said shells having flanges extending radially outwardly of the adjacent ends thereof and adapted to have end to end engagement with each other upon the full insertion of said plugs into said receptacles,
means connected between said flanges to draw said flanges together and maintain said flanges in direct abutting engagement with each other, and
said flanges having abutting finished faces of sufficient radial length to cool and extinguish a flame within said connection box when said flanges are drawn into tight abutting engagement with each other.

References Cited

UNITED STATES PATENTS

| 134,990 | 1/1873 | Hood | 151—57 |
|---|---|---|---|
| 448,680 | 3/1891 | Shlaudeman | 339—92 X |
| 473,637 | 4/1892 | McElroy | 339—49 |
| 777,192 | 12/1904 | Ette | 151—57 |
| 1,152,005 | 8/1915 | Clark | 339—89 X |
| 2,987,691 | 6/1961 | Ross | 339—89 X |
| 3,099,506 | 7/1963 | Tuchel | 339—143 |

FOREIGN PATENTS

| 934,949 | 8/1963 | Great Britain. |
|---|---|---|

MARVIN A. CHAMPION, *Primary Examiner.*

P. A. CLIFFORD, *Assistant Examiner.*